United States Patent
Antony et al.

(10) Patent No.: US 6,619,440 B2
(45) Date of Patent: Sep. 16, 2003

(54) BRAKE

(75) Inventors: Paul Antony, Worms (DE); Gerhard Berger, Germersheim (DE); Wolfgang Falter, Heidelberg (DE); Hellmut Jäger, Ludwigshafen (DE); Marcus Keller, Edingen-Neckarhausen (DE); Roland Keller, Leimen (DE)

(73) Assignee: Wabco Perrot Bremsen GmbH, Mannheim (DE)

( * ) Notice: Subject to any disclaimer, the term of this patent is extended or adjusted under 35 U.S.C. 154(b) by 0 days.

(21) Appl. No.: 10/242,027

(22) Filed: Sep. 11, 2002

(65) Prior Publication Data

US 2003/0052562 A1 Mar. 20, 2003

(30) Foreign Application Priority Data

Sep. 18, 2001 (DE) .......................... 101 45 947

(51) Int. Cl.⁷ .............. G01P 3/48; B60T 8/32
(52) U.S. Cl. ...................... 188/17; 188/18 A
(58) Field of Search .................. 188/17, 18 R, 188/18 A, 218 XL; 310/168; 324/166, 173

(56) References Cited

U.S. PATENT DOCUMENTS

2002/0167305 A1 * 11/2002 Sentoku et al. ............. 324/173
2002/0175258 A1 * 11/2002 White et al. ................ 248/314

FOREIGN PATENT DOCUMENTS

| DE | 4008878 | 10/1990 |
|----|---------|---------|
| DE | 4230012 | 8/1999  |
| EP | 0666478 | 5/1998  |

* cited by examiner

Primary Examiner—Christopher P. Schwartz
(74) Attorney, Agent, or Firm—Friedrich Kueffner (57) ABSTRACT

A brake includes a rotating element and a magnet wheel mounted on the rotating element so as to rotate with the rotating element about an axis of rotation. The magnet wheel has a first side extending transversely of the axis of rotation and facing the rotating element and a second side extending transversely of the axis of rotation and facing away from the rotating element. A first axial stop interacts with a first stop section located on the first side of the magnet wheel and a second axial stop interacts with a second stop section located on the second side of the magnet wheel for limiting an axial movement of the magnet wheel relative to the rotating element to a first predetermined amount. Along each line extending parallel to the axis of rotation and extending through the first or the second axial stop, the distance between the first stop section and the second stop section is smaller than the distance between the first axial stop and the second axial stop.

13 Claims, 7 Drawing Sheets

BRAKE

BACKGROUND OF THE INVENTION

1. Field of the Invention

The invention relates to a brake with a rotating element, with a magnet wheel, which is held on the rotating element in such a way that it rotates with the rotating element about an axis of rotation, a first side of the magnet wheel, which lies transversely to the axis of rotation, faces the rotating element, and a second side of the magnet wheel, which lies transversely to the axis of rotation, faces away from the rotating element, and with a first axial stop that interacts with a first stop section located on the first side of the magnet wheel and a second axial stop that interacts with a second stop section located on the second side of the magnet wheel for limiting the axial movement of the magnet wheel relative to the rotating element to a first predetermined amount.

2. Description of the Related Art

Brakes of the type referred to above are well known and are described, for example, in DE 42 30 012 C2 and EP 0 666 478 B1.

In a first embodiment described in DE 42 30 012 C2, the magnet wheel has an integrated spring, which axially pretensions the magnet wheel in the direction of the rotating element, which in this case is a brake disk. In accordance with a second embodiment, an end section of the magnet wheel is radially widened towards the outside and engages a corresponding recess in the brake disk, which likewise produces axial pretensioning of the magnet wheel in the direction of the brake disk.

In accordance with EP 0 666 478 B1, axial pretensioning of the magnet wheel against the rotating element, which in this case is also a brake disk, is achieved by providing the magnet wheel with spring-like projections that fit into grooves.

In the previously known brakes, the mount for mounting the magnet wheel on the rotating element tends to experience rust creepage. This can lead to distortion of the magnet wheel. Furthermore, it is difficult to change the magnet wheel. In addition, the previously known mounts for mounting the magnet wheel on the rotating element do not allow compensation for differences in material expansion when the brakes become hot, which means that there is the risk that the magnet wheel will fail to remain in its proper position.

SUMMARY OF THE INVENTION

The object of the invention is to refine a brake of the above-mentioned type in such a way that the risk of rust creepage is eliminated and space is available for the consequences of differences in material expansion.

In accordance with the invention, this object is met by providing that, along each line that is parallel to the axis of rotation and extends through the first or the second axial stop, the distance between the first stop section and the second stop section is smaller than the distance between the first axial stop and the second axial stop.

The invention is based on the surprisingly simple recognition that the problems arising in the state of the art are minimized, if the axial pretensioning of the magnet wheel against the rotating element is practically eliminated. In other words, in accordance with the invention, the magnet wheel is supported in a quasi-"floating" way. Specifically, since the distance between the first stop section and the second stop section is smaller than the distance between the first axial stop and the second axial stop, the magnet wheel always rests at most against one axial stop or the other, but never against both axial stops at the same time. This leads to considerable reduction or even elimination of rust creepage. Furthermore, it is self-evident that the "floating" bearing or mounting of the magnet wheel on the rotating element also tolerates differences in material expansion under the influence of heat, so that these differences in expansion do not cause distortion of the magnet wheel.

In accordance with the invention, it is preferred for the second axial stop to be formed on a separate retaining device. In this way, the magnet wheel can have a much simpler design, especially compared to the design described in EP 0 666 478 B1.

In another preferred embodiment, the first axial stop may be formed on a separate retaining device. This allows a simpler design of the rotating element. It is also not necessary for cooling vanes possibly present on the rotating element to be simultaneously used for the originally unintended purpose of retaining the magnet wheel, as is the case, for example, in the design specified in DE 42 30 012 C2.

In another preferred embodiment of the invention, the rotating element has a recess for at least partially receiving the retaining device. The formation of this type of recess on the rotating element is a very simple design measure that otherwise entails no disadvantages with respect to the construction of the rotating element.

In a preferred and especially simple development of the invention, the retaining device has a snap ring or spring ring. A snap ring or spring ring combines the advantages of especially simple installation and removal, on the one hand, and an especially high degree of reliability, on the other hand.

Additionally or alternatively, it is possible, in accordance with the invention, for the retaining device to have an anchoring device that lies parallel to the axis of rotation. This makes it especially easy to install and remove the retaining device and thus the magnet wheel, because the anchoring element needs to be moved only in the axial direction to accomplish these tasks.

A design in which the second axial stop lies at a free end of the anchoring element is preferred as an especially simple design. In other words, use is made, for example, of the principle of a screw with a screw head, such that the underside of the screw head serves as the axial stop.

To that extent, it is further preferred, in accordance with the invention, for the second axial stop to be formed in one piece with the anchoring device.

Alternatively, however, the second axial stop may also be formed on a disk penetrated by the anchoring device. In this way, especially the surface of the second axial stop can be enlarged beyond the standard size of, for example, screws, which further increases flexibility.

In accordance with an especially preferred embodiment of the invention, the first stop section is formed on an axial extension of the rotating element, which covers an angular sector about the axis of rotation of less than 360⌗. Compared to a design with a first stop section that is closed like a ring, this decreases the stop surface, which reduces to a minimum both heat transfer from the material of the brake to the magnet wheel and the possibility of incipient rusting. Furthermore, lateral surfaces of the axial extension that are directed in the peripheral direction may serve the purpose of rotational coupling with the magnet wheel.

In another preferred embodiment of the invention, the brake has a radial stop that interacts with a third stop section of a peripheral surface of the magnet wheel for limiting movement of the magnet wheel relative to the rotating element in a direction transverse to the axis of rotation to a second predetermined amount, which is greater than zero.

In other words, in this embodiment of the invention, the magnet wheel is supported in a quasi-"floating" way not only in the axial direction, but also in the direction transverse to the axis of rotation. Therefore, this embodiment also contributes to the prevention of rust creepage and to tolerance of differences in material expansion due to heating.

A centering device for guiding the magnet wheel during mounting on the rotating element is especially preferred in accordance with the invention.

Finally, the invention provides that the rotating element is a brake disk. In other words, in accordance with this embodiment of the invention, the magnet wheel is mounted on the brake disk. In this way, the information acquired with the magnet wheel regarding the current angle of rotation and the current rotational speed of the brake disk and thus the wheel is especially accurate.

DETAILED DESCRIPTION OF THE PREFERRED EMBODIMENTS

Figure 1:
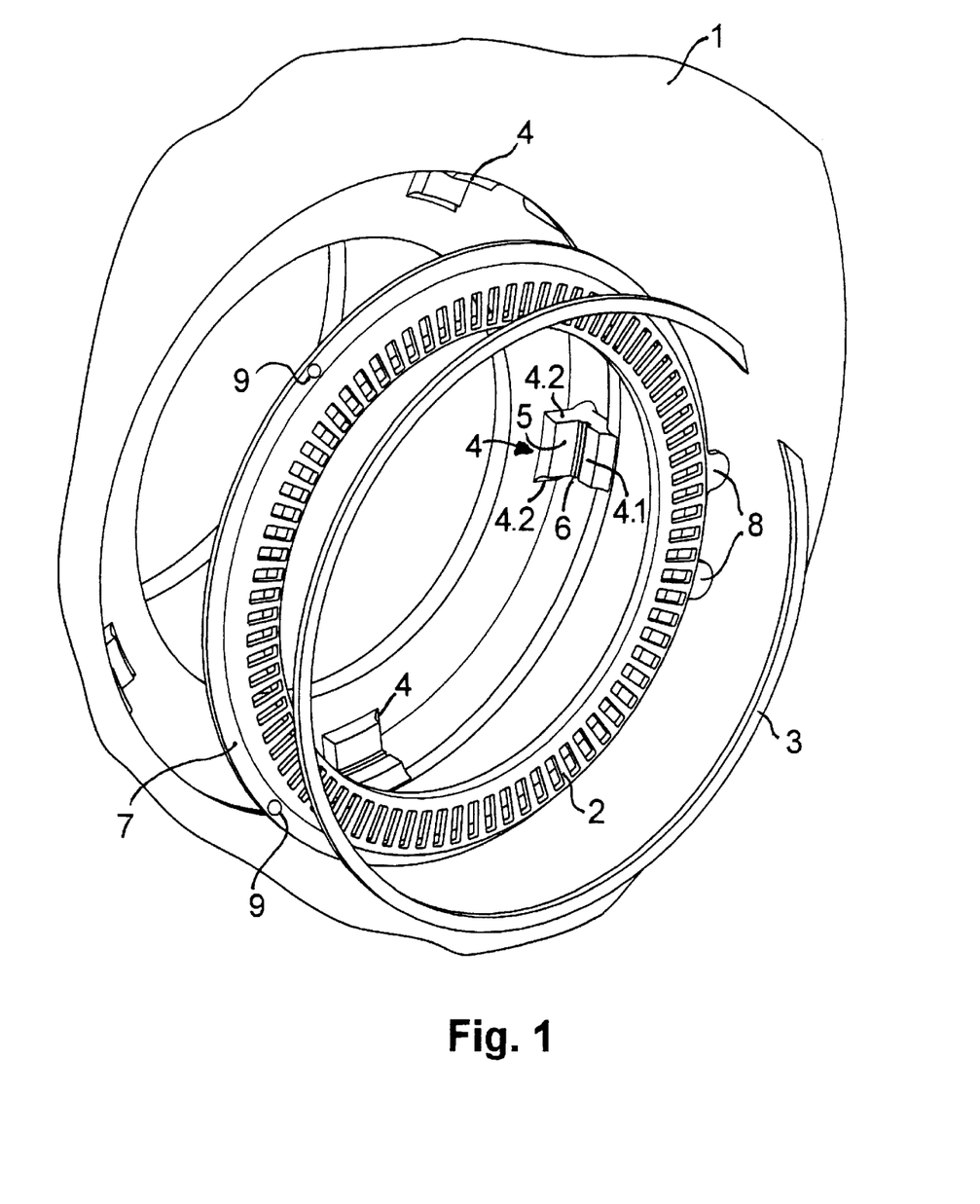
FIGS. 1 to 3 are schematic views of a first embodiment of the mounting of a magnet wheel on a brake disk of a brake in accordance with the invention.

FIG. 1 shows a brake disk 1 of a brake, a magnet wheel 2, and a snap ring or spring ring 3. The magnet wheel 2 has openings, whose angular position and/or speed of rotation during operation are detected by a sensor, which is not shown in the drawing. The sensor signal is supplied, for example, to an ABS (antilock brake system) or other monitoring system.

The brake disk 1 has a contact surface 5, which is bounded by a radial collar 4, with a (discontinuous) snap ring groove 6 that is spaced a certain distance from it. A region 4.1 of the radial collar 4 extends towards the open part of the brake disk as an insertion region for the magnet wheel 2 and the snap ring or spring ring 3.

Figure 2:
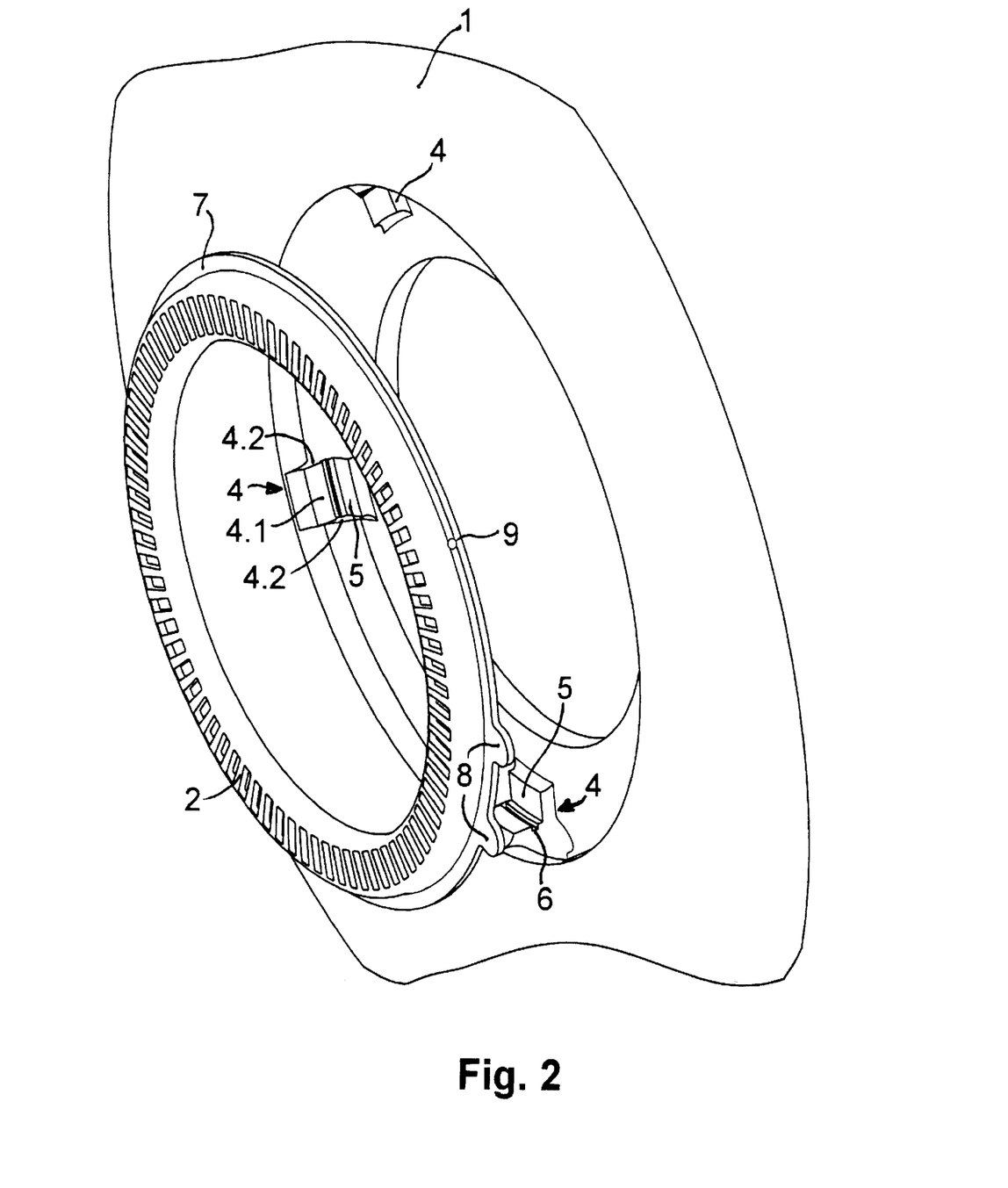

In FIG. 2, the magnet wheel is provided with a retaining flange 7, which rests against the contact surface 5. In the embodiment shown here, the pulse openings in the axial direction are designed for a pulse detector or sensor situated opposite them (not shown in the drawing). However, the openings may also be positioned in the radial direction in the magnet wheel. Two projections 8 on the retaining flange serve to prevent twisting of the magnet wheel 2 relative to the brake disk 1. Together with corresponding projections of the brake disk 1, they form the rotational guard.

The snap ring or spring ring 3 is inserted in the snap ring groove 6 to limit the axial movement of the magnet wheel 3. The radial movement of the magnet wheel is limited by the radial collar 4. There is radial play Xr between the diameters of the retaining flange 7 and the radial collar 4, which allows radial yielding movement of the magnet wheel and thus prevents deformation that would otherwise be caused by differences in thermal expansion. Furthermore, the radial play Xr allows deformation-free mounting and removal of the magnet wheel 2. Only when the snap ring or spring ring 3 has been inserted in place, is the magnet wheel 2 ("floatingly") supported on the brake disk 1.

The insertion region 4.1 is set at an oblique angle. In this way, the mechanical insertion of the magnet wheel 2 and the subsequent pressing of the snap ring or spring ring 3 into the snap ring groove 6 are improved or simplified by "self-centering".

Figure 3:
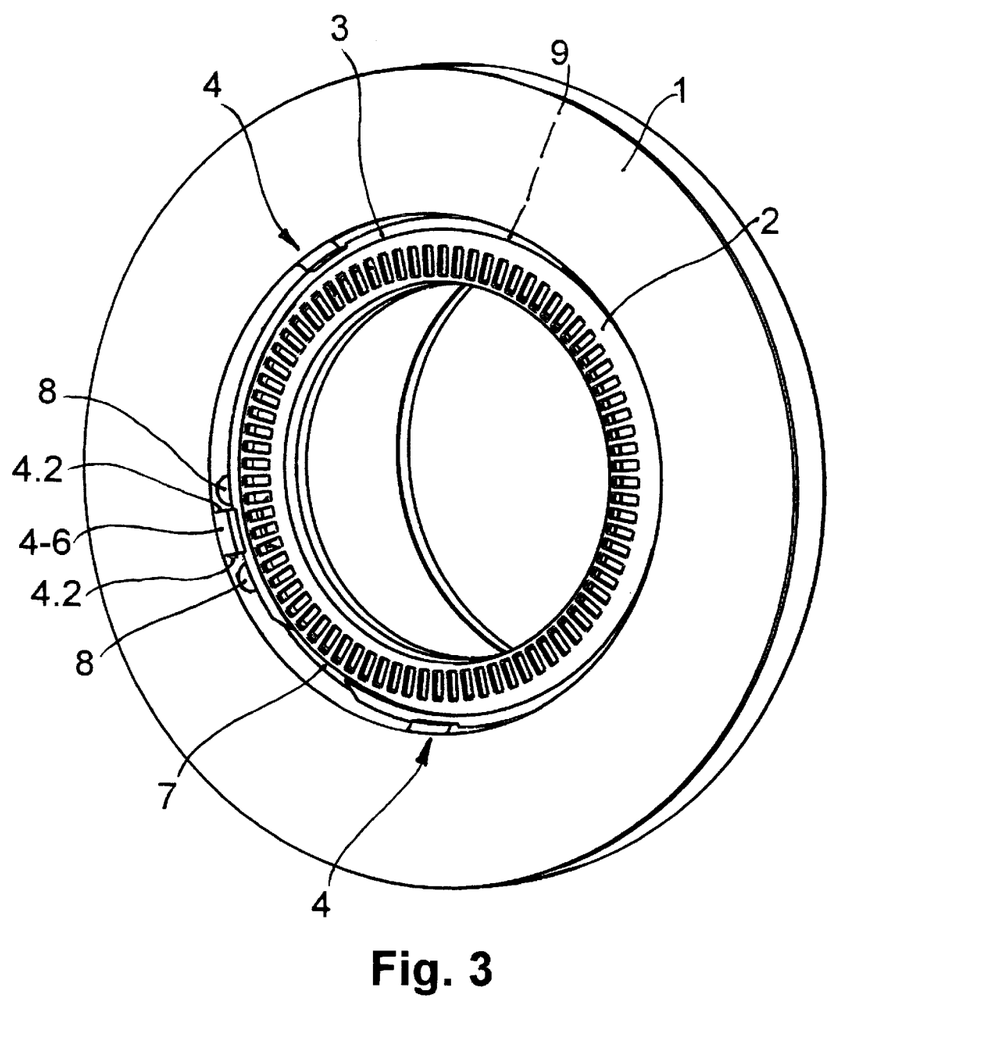

In the embodiment shown in FIG. 1, the magnet wheel mounting on the brake disk 1 does not cover the whole surface, but rather is discontinuous. This interruption is due to the fact that the contact surface 5 is formed on an extension on the brake disk that does not have a ring-shaped design, but rather has the form of a flange or web. As is apparent in FIG. 2, the embodiment shown in FIGS. 1 to 3 has not just one, but rather several peripherally distributed contact surfaces 5. The individual segments formed in this way reduce the heat bridge from the brake disk 1 to the magnet wheel 2. In addition, due to the resulting reduction of the working surface, there is less static friction between the magnet wheel 2 and the brake disk 1. This decisively improves the possibility of radial yielding movement of the magnet wheel 2 relative to the brake disk 1, and, in addition, the reduced contact surfaces present less surface that could become subject to corrosive attack. This makes it much easier to install or change the magnet wheel. The rotational guard can also be more easily produced, because the two projections 8 of the retaining flange 7 grip lateral surfaces 4.2 of the individual segments referred to above, which eliminates the need for additional elements for securing the magnet wheel against rotation relative to the brake disk.

To further relieve the bearing(s) on the individual segments of possible axial prestressing forces, projections 9 (bosses) are provided on the retaining flange 7. In this way, the contact surface between the snap ring or spring ring 3 and the flange 7 is limited to the upper surface of the projections 9, so that the retaining flange 7 and the snap ring or spring ring 3 are not in full-surface contact. Since, moreover, the bosses 9 are rotationally staggered in the peripheral direction of the magnet wheel 2 with respect to the segment regions with the contact surfaces 5 (cf. FIGS. 1.1a and 1.1b) and are thus outside of the segment regions, i.e., they do not make contact in those places where the magnet wheel 2 makes contact with the contact surfaces 5, this effect can be even further improved. This effectively eliminates complete or incipient rusting by rust creepage. In this way, the snap ring or spring ring 3 can apply axial forces to the magnet wheel 2 only at those places on the retaining flange 7 where there are no contact surfaces 5. This allows axial play Xa (FIG. 1.1b) in addition to the radial play Xr described earlier. These two directions of play allow optimum yielding movements.

Figure 4:
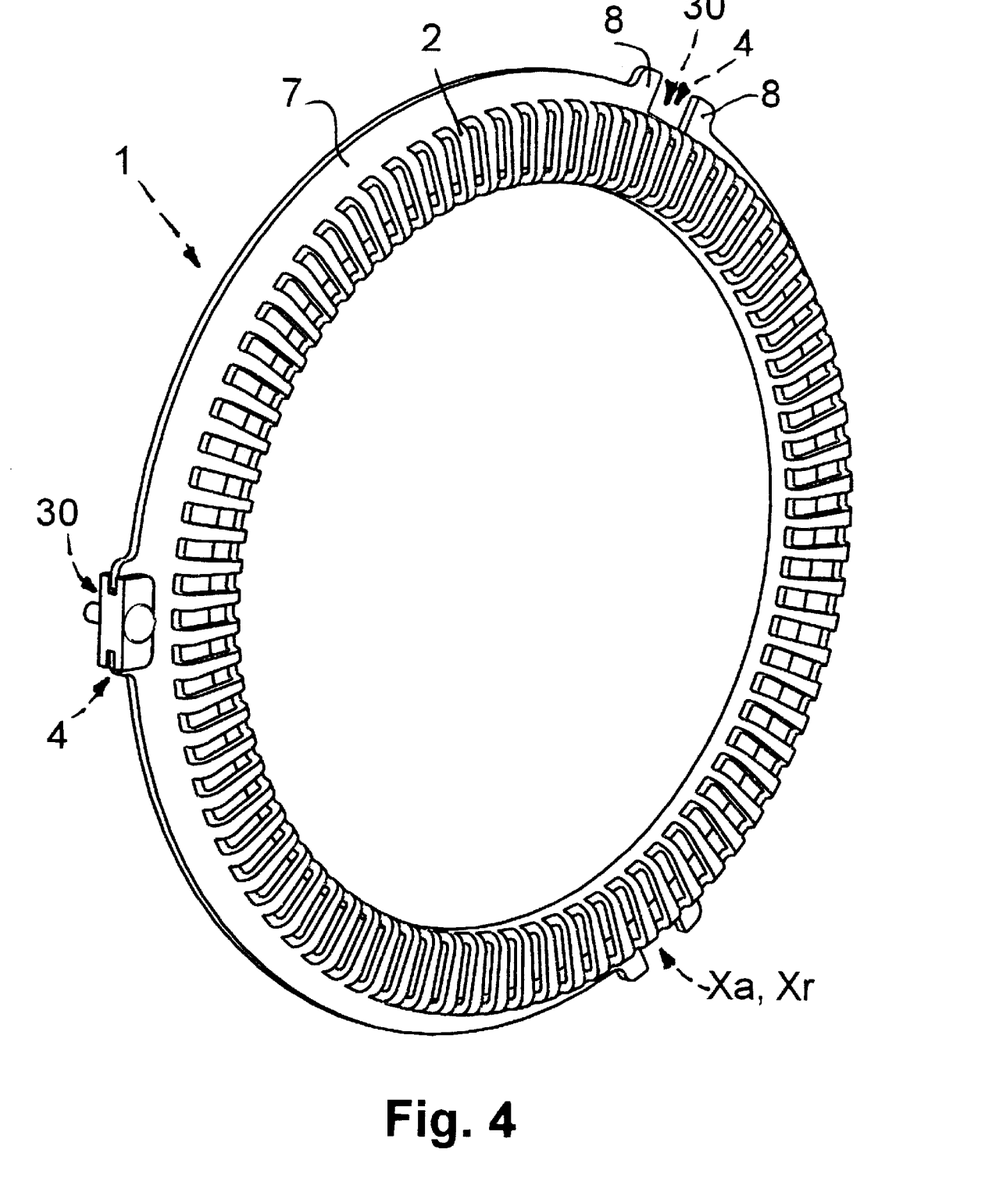
FIGS. 4 and 5 show a second embodiment.
Figure 5:
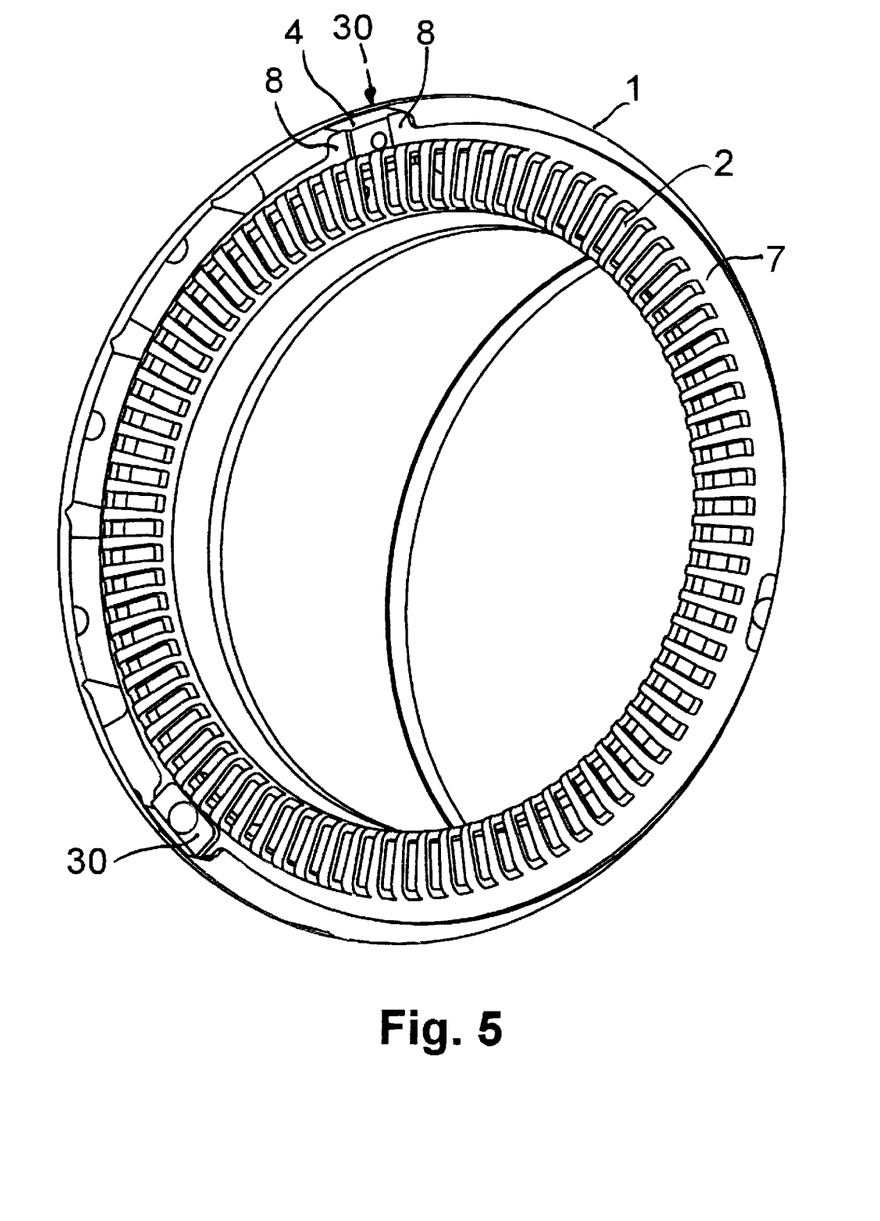

In the embodiment shown in FIGS. 4 and 5, the magnet wheel 2 has several pairs of projections 8 on its retaining flange 7, such that the two projections 8 of each pair of projections grips a fastening device 30 in a central groove. The fastening device 30 is fastened to the brake disk 1 either directly or by bolt, rivet, screw, or spring action. Axial and possibly radial play that allows for yielding movements is present between the fastening device 30 and the magnet wheel 2. This variation offers the further advantage that there is contact with the brake disk 1 only through the fastening device, which minimizes especially heat transfer.

Figure 6:
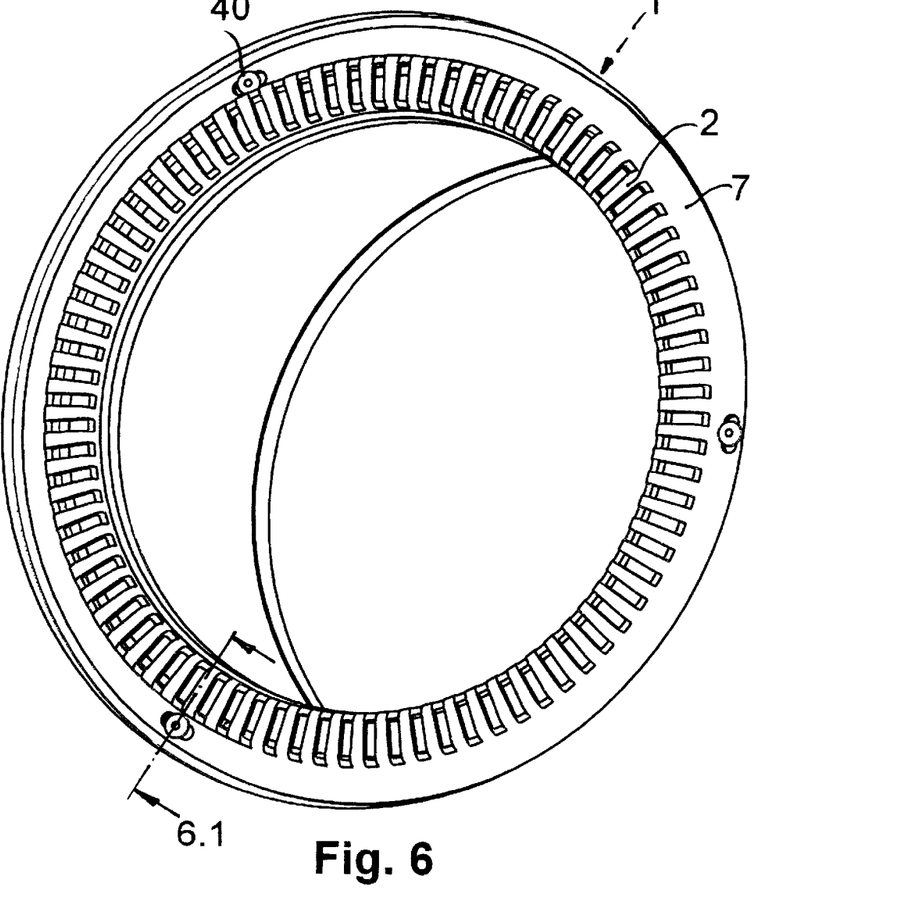
FIGS. 6 and 6.1 show a third embodiment.
Figure 61:
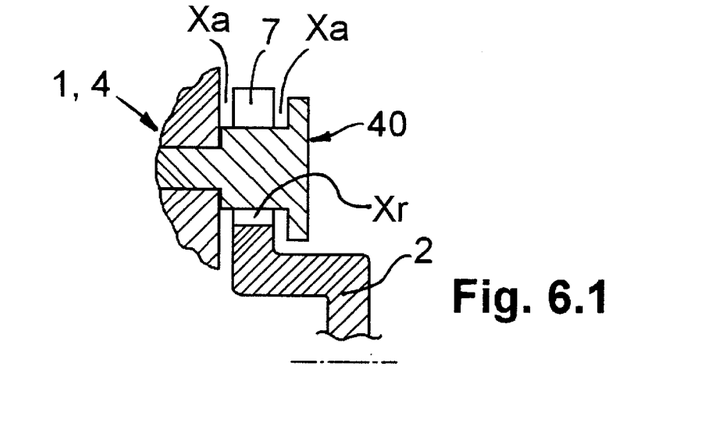

In the embodiment shown in FIGS. 6 and 6.1, the magnet wheel 2 is fastened to the brake disk 1 by a fastening device

40, in which two projections 8 are formed either by a radial opening or by a radial slot within the retaining flange 7, cf. FIG. 6.1. The fastening device 40 is formed in steps to be fastened as a rivet, screw, or bolt to the brake disk 1 and to allow the magnet wheel 2 axial and possibly radial yielding movements by suitable play Xa, Xr.

Although FIGS. 1 to 6.1 show a magnet wheel with a retaining flange 7 on the radially outer circumference and a corresponding mounting on the brake disk 1, it is expressly pointed out that the retaining flange 7, including the mounting on the brake disk 1, can also be arranged radially on the inner circumference according to the installation conditions—with retention of all of the features.

Furthermore, the invention also includes designs in which the magnet wheel can be supported, not on a brake disk, but rather, for example, on a brake drum, a wheel hub, or any other rotating element of a brake or a wheel.

The features disclosed in the above specification, the claims and the drawings may be important both individually and in any desired combinations for realizing the invention in its various embodiments.

While specific embodiments of the invention have been shown and described in detail to illustrate the inventive principles, it will be understood that the invention may be embodied otherwise without departing from such principles.

We claim:

1. A brake comprising a rotating element and a magnet wheel mounted on the rotating element so as to rotate with the rotating element about the axis of rotation, wherein the magnet wheel has a first side extending transversely of the axis of rotation and facing the rotating element, and wherein the magnet wheel has a second side extending transversely of the axis of rotation and facing away from the rotating element, further comprising a first axial stop configured to interact with a first stop section located on the first side of the magnet wheel and a second axial stop configured to interact with a second stop section located on the second side of the magnet wheel for limiting an axial movement of the magnet wheel relative to the rotating element to a first predetermined amount, wherein, along each line extending parallel to the axis of rotation and extending through one of the first and second axial stops, a distance between the first stop section and the second stop section is smaller than a distance between the first axial stop and the second axial stop.

2. The brake according to claim 1, wherein the second axial stop is formed on a separate retaining device.

3. The brake according to claim 2, wherein the retaining device comprises an anchoring device extending parallel to the axis of rotation.

4. The brake according to claim 3, wherein the second axial stop is located at a free end of the anchoring device.

5. The brake according to claim 4, wherein the second axial stop is formed integrally with the anchoring device.

6. The brake according to claim 4, wherein the second axial stop is formed on a disk, and wherein the anchoring device extends through the disk.

7. The brake according to claim 2, wherein the rotating element has a recess for at least partially receiving the retaining device.

8. The brake according to claim 2, wherein the retaining device comprises a spring ring.

9. The brake according to claim 1, wherein the first axial stop is formed on a separate second retaining device.

10. The brake according to claim 1, wherein the first axial section is formed on an axial extension of the rotating element, and wherein the axial extension covers an angular sector about the axis of rotation of less than 360 degrees.

11. The brake according to claim 1, comprising a radial stop configured to interact with a third stop section of a peripheral surface of the magnet wheel for limiting a movement of the magnet wheel relative to the rotating element in a direction extending transversely of the axis of rotation to a second predetermined amount which is greater than zero.

12. The brake according to claim 1, further comprising a centering device for guiding the magnet wheel when mounting the magnet wheel on the rotating element.

13. The brake according to claim 1, wherein the rotating element is a brake disk.

* * * * *